United States Patent Office.

PHILIP H. HOLMES, OF GARDINER, MAINE, ASSIGNOR TO THE HOLMES FIBRE-GRAPHITE MANUFACTURING COMPANY, OF CHICAGO, ILLINOIS.

COMPOSITION OF MATTER.

SPECIFICATION forming part of Letters Patent No. 482,176, dated September 6, 1892.

Application filed January 2, 1892. Serial No. 416,855. (No specimens.)

*To all whom it may concern:*

Be it known that I, PHILIP HENRY HOLMES, a citizen of the United States, and a resident of Gardiner, Kennebec county, Maine, have invented an Improved Composition of Matter, of which the following is a specification.

My invention consists of a composition of matter of which plumbago is the base, the composition being applicable for use as a bearing, packing, projectile guide or ring, and in any place where two parts come into frictional contact, and it can also be used as a conductor of electricity and in other cases where plumbago is required in a solidified or molded shape.

The object of my present invention is to produce a composition that will be as free as possible from other substances, except carbon. The composition consists of plumbago, carbonizable fiber, and carbonizable liquid molded dried, and heated to such an extent as to carbonize the fiber and liquid.

I carry out my invention in substantially the following manner: I first take plumbago (by preference finely-divided plumbago) and float it, so as to obtain as pure an article as possible, although for some uses a commoner grade of plumbago may be used, according to the purpose for which the article is intended. I then mix the plumbago with a carbonizable fiber—such as wood fiber—in a pulpy condition, the object of reducing the wood fiber to a pulp being to separate the fiber, so that it will become finely divided and intimately mixed with the plumbago. The pulp and plumbago are mixed in a liquid, (preferably water,) so as to form a pasty mass, and to this mixture is added a quantity of finely-divided granular mineral substance, which serves with the fiber as a filtering medium when the mass is compressed in the mold to drive off the water. The granular mineral substance which I prefer to use is an inert material, such as gypsum, which material I have used with success, although it will be understood that other granular mineral substances will accomplish the purpose. The proportion of plumbago to fiber will vary considerably, as for some purposes the proportion of plumbago will greatly exceed the fiber, while in other cases the proportion of plumbago and fiber may be equal or nearly equal. The inert granular mineral substance is added to act as a filtering medium and may vary according to the character and form of the mold. The compound is introduced into a mold having perforations to allow for the escape of the liquid and provided with a plunger for compressing the material in the mold. I preferably pump the material into the mold, after which the plunger is forced in until the material is compressed to the degree required and the water or other liquid is driven off from the composition through the perforations in the mold. The compressed composition is then removed from the mold and dried, so as to expel all of the moisture therefrom, and is then immersed in a bath of a suitable carbonizable liquid—such as oil—and allowed to remain until it is impregnated or saturated with the oil, and to facilitate this impregnation it is preferable that the bath of oil should be hot, the mass being more or less saturated with oil, depending upon the character of the composition. It will be understood that any oil or varnish which can be carbonized will answer the purpose. It is preferable to place the oiled article in a closed vessel heated to a sufficient temperature to assist in driving the oil into the interstices of the composition. The molded and oiled composition thus produced is then placed in a suitable retort or oven in order to subject the compound to the process of carbonization, preferably out of free contact with air. The compound is thereby changed into a tough coherent mass containing an excess of plumbago, which is caused to cohere by the double action of the fibrous or structural carbon derived from the carbonization of the carbonizable fiber and the deposited carbon derived from the carbonization of the oil or other suitable carbonizable liquid, which was incorporated with the mixture prior to carbonization and which acts as a binder for the mass. The extent of carbonization of the compound will depend greatly upon the use for which the same is intended, as in some cases it may be preferable to carbonize only a portion of the compound, while in other cases it will be preferable to carbonize the entire mass. The compound thus produced makes an excellent bearing, but is also a good conductor of electricity, as the oil and fiber have been converted into electric-conducting carbon. In some instances it may be desirable to merely carbonize the fiber, and in this case the heat is carried to such an extent as to carbonize the fiber and not carbonize the main body of carbonizable liquid.

I claim as my invention—

1. A composition of matter consisting of plumbago, carbonized fiber, and a binder, substantially as specified.

2. A composition of matter consisting of plumbago combined with structural and deposited carbon, substantially as described.

3. The process herein described of making a plumbago and carbon compound, said process consisting, essentially, in, first, mixing plumbago and fiber; second, subjecting the mass to pressure; third, drying the mass; fourth, immersing it in oil, and, finally, baking the mass to carbonize the oil and fiber, substantially as set forth.

In testimony whereof I have signed my name to this specification in the presence of two subscribing witnesses.

PHILIP H. HOLMES.

Witnesses:
EUGENE ELTERICH,
HENRY HOWSON.